US Patent [19] Ver Ploeg

[11] 3,797,544
[45] Mar. 19, 1974

[54] CUTTER DISC
[76] Inventor: Alonzo Ver Ploeg, Rt. No. 1, Pella, Iowa 50219
[22] Filed: July 21, 1972
[21] Appl. No.: 274,082

[52] U.S. Cl.................. 144/235, 144/2 N, 144/240
[51] Int. Cl........................ B27g 13/04, A01g 23/06
[58] Field of Search ........... 144/235, 234, 233, 218, 144/240, 2 N

[56] References Cited
UNITED STATES PATENTS

| | | | |
|---|---|---|---|
| 3,570,566 | 3/1971 | McCreery | 144/235 |
| 1,162,792 | 12/1915 | Lutze | 144/233 |
| 2,992,664 | 7/1961 | DeShano | 144/235 |

Primary Examiner—Donald R. Schran
Attorney, Agent, or Firm—Zarley, McKee & Thomte

[57] ABSTRACT

A stump cutting machine includes a rotatable cutter disc having a plurality of cutter tools on opposite sides thereof and each of the tools includes a bit holder having half sections for clamping the shank of a bit therebetween in a slot formed in the mating face of one of the half sections. The mating faces of the half sections are in a plane extending at an angle to the disc such that the bit extends at an angle to the disc and radially outwardly from the disc center axis of rotation. The bit holder may be turned between two positions 180 degrees apart and the bit will extend outwardly relative to the disc in one position and inwardly relative to the disc in the other position. A pair of bolts extend through the holder half sections and the disc to connect two holders on the disc on opposite sides thereof. The depth of the slot perpendicular to the face thereof is less than the thickness of the bit shank to assure clamping action by the two half sections when drawn tightly together. The bits include a cutting head having a depth limiting shoulder such that all bits extend uniformly into the bit holders at equal distance and are limited by the shoulders engaging the outer edge of the holder.

10 Claims, 13 Drawing Figures

PATENTED MAR 19 1974 3,797,544
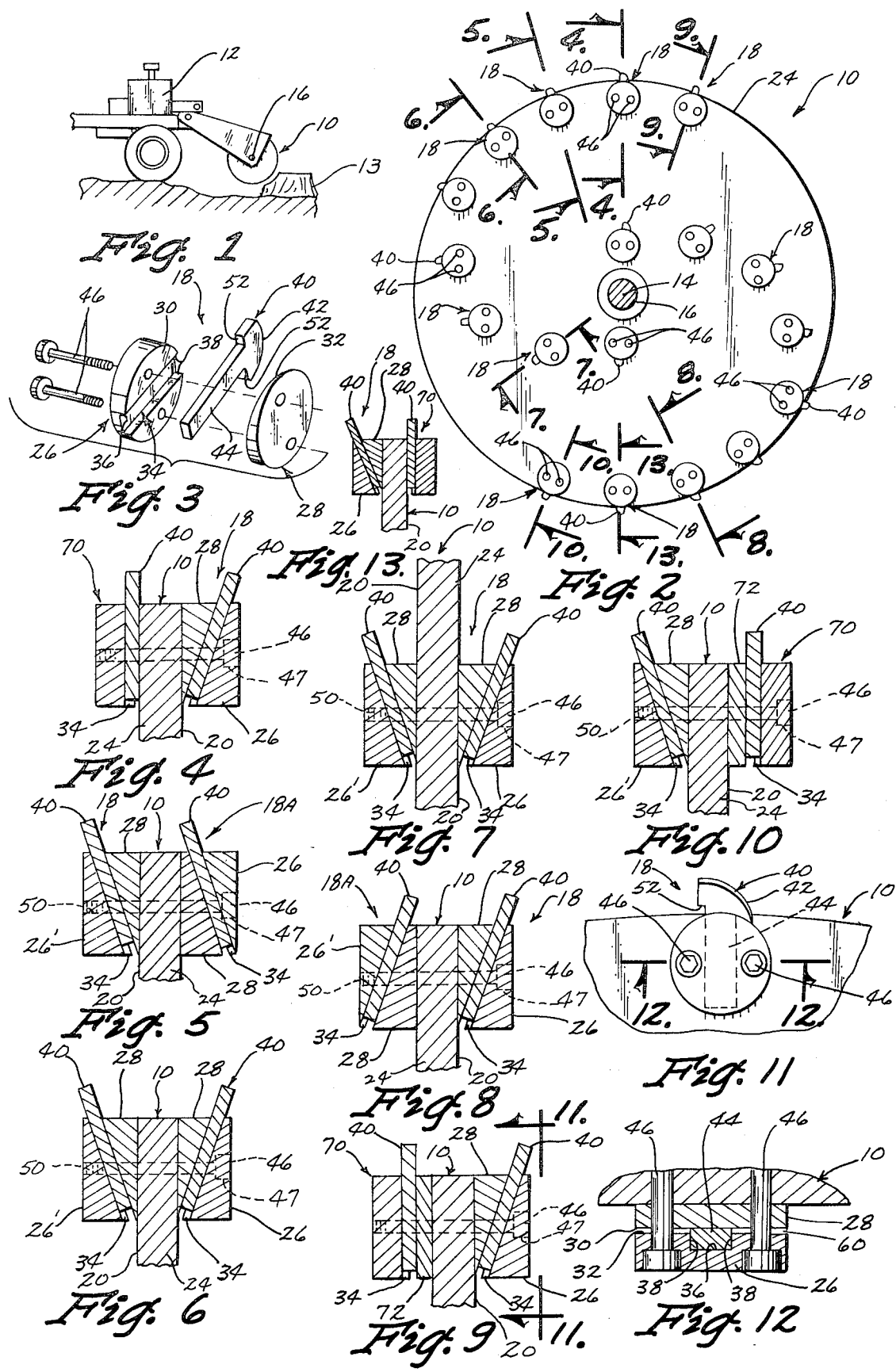

CUTTER DISC

Heretofore cutting discs for tree stumps or the like have required a plurality of different bit holders and differently shaped bits resulting in an expensive piece of equipment for which it is difficult to stock replacement parts as a large supply is required where there are a large number of different parts required.

The cutter disc of this invention includes a plurality of cutter tools on opposite sides of the cutting disc arranged in a spiral fashion. Except for bits extending parallel to the plane of the disc the other bits extend either inwardly or outwardly relative to the disc. These bits all use the same bit holder. It is only necessary to rotate the bit holder 180° about its own center axis to provide the desired angular position.

The versatility of this bit holder is the result of utilizing a bit holder having half sections including mating faces in a plane extending at an angle to the cutter disc. A slot or channel is cut into the face of one of the half sections and the shank of the bit is matingly received therein. The thickness of the shank is greater than the depth of the slot measured along a line perpendicular to the face and thus the shank is clamped between the mating half sections. A pair of bolts extend transversely through the half sections on opposite sides of the bit shank and may extend through the disc to connect another bit holder onto the opposite side of the disc.

Accordingly, when utilizing the universal bit holder of this invention it is not necessary to have a large variety of different bit holders or bits since only one is required for the angularly disposed bits. The bits which are positioned in a straight manner on the disc utilize a holder having a slot cut in one face to receive the bit shank and the holder is then bolted onto the disc or on to a spacer between the holder and the disc. In all cases the same bit is used.

The balance of the disc is maintained by appropriately arranging the bit holders on both sides of the disc. The holders all being the same size in exterior configuration result in the bits extending a uniform distance into the holder with the head of the bits engaging the outer edge of the bit holders.

This invention consists in the construction, arrangements and combination of the various parts of the device, whereb the objects contemplated are attained as hereinafter more fully set forth, specifically pointed out in the claims, and illustrated in the accompanying drawings in which:

FIG. 1 is a fragmentary side elevation view of a stump cutting machine employing the cutting disc of this invention.

FIG. 2 is an enlarged in scale side elevational view of the cutting disc.

FIG. 3 is a perspective view of the cutter tool.

FIG. 4 is a cross sectional view taken along line 4 — 4 of FIG. 2.

FIG. 5 is a cross sectional view taken along line 5 — 5 in FIG. 2.

FIG. 6 is a cross sectional view taken along line 6 — 6 in FIG. 2.

FIG. 7 is a cross sectional view taken along line 7 — 7 in FIG. 2.

FIG. 8 is a cross sectional view taken along line 8 — 8 in FIG. 2.

FIG. 9 is a cross sectional view taken along line 9 — 9 in FIG. 2.

FIG. 10 is a cross sectional view similar to FIG. 9 but includes a spacer on the right-hand side.

FIG. 11 is a cross sectional view taken along line 11 — 11 in FIG. 9.

FIG. 12 is a cross sectional view taken along line 12 — 12 in FIG. 11; and

FIG. 13 is a cross sectional view taken along line 13 — 13 in FIG. 2.

The cutter disc of this invention is referred to in FIG. 1 generally by the reference numeral 10 and is seen mounted on a stump cutting machine 12 operating on a stump 13.

The disc 10 is circular in shape and includes a center axis of rotation 14 through a center shaft 16. A plurality of cutter tools 18 are mounted on opposite sides 20 and 22 of the disc 10 as seen in FIG. 3 and 7. The cutter tools on each side of the disc 10 define two spirals starting at the outer peripheral edge of the disc and ending adjacent and on opposite sides of the center rotational axis 14. Thus it is seen that the disc 10 is balanced on each of its sides and one side is balanced relative to the opposite side.

The cutter tool 18, as seen in FIG. 3, includes a pair of inner and outer half sections 26 and 28 circular in shape and having mating faces 30, 32 positioned in a plane extending at an angle to the disc 10. A slot or channel 34 having a bottom side wall 36 and oppositely disposed parallel side wall surfaces 38 extends the full diameter of the outer half section 26. The bottom wall 36 is parallel to the face 30.

A bit 40 having a cutting head 42 and a shank 44 is positioned with the shank 44 in the slot 34. A pair of bolts 46 extend through the half sections 26 and 28 on opposite sides of the bit shank 44 and draw the half sections into clamping engagement with the shank 44 to hold it firmly in place. The shank 44 is rectangular in cross section and has a thickness slightly greater than the depth of the slot 34 measured perpendicularly to the bottom wall 36 such that clamping action results between the holder half sections 26 and 28 when drawn together by the bolts 46. It is further seen in FIG. 7 that the bolts 46 have heads received in countersunk holes 47 in half section 26 and then extend through a tool holder 18 on the opposite side of the disc 10 and threadably engage the openings 50 in the outer half section 26'. The half sections 26 and 26' differ only in that half section 26 has countersunk openings for the bolt heads and the half section 26' has the threaded openings 50.

The bit 40 includes a pair of shoulder surfaces on the inner side of the head 42 on opposite sides of the shank 44 for engagement with the rounded exterior surface of the holder 18 such that the insertion of the bits into the holders is uniform. The bits 40 may be positioned on the disc 10 to extend inwardly towards the disc as seen in FIGS. 5 and 8, wherein the holders 18A position bits 40 to extend at an angle towards the disc 10. The same holder half sections 26 and 28 are employed but the holder 18 is simply rotated 180 degrees about its own axis and the bit 40 is reinserted in the opposite end of the slot 34.

In FIG. 12 it is seen that the thickness of the bit shank 44 is just sufficient to maintain a spacing 60 between the inner surfaces 30 and 32 on the half sections 26 and 28.

In order that complete cutting action of the stump 14 be provided, bits 40 are positioned in a plane parallel to the disc 10. A holder 70 (FIG. 13) is utilized which is similar to the holder half section 26 but has an inner clamping face disposed in a plane parallel to the face 20 of the disc 10 and, accordingly, the slot 34 for the bit 40 is also arranged parallel to the disc face 20.

In FIGS. 9 and 10, the bits 40 arranged parallel to the disc 10 are spaced therefrom by a spacer 72 to give a more complete cutting action.

Thus in operation it is seen that all of the cutter tools utilize the same bit 40 and all of the angularly disposed bits are held by a common holder including an outer half section 26 or 26' and an inner spacer half section 28 whereas all bits that are arranged parallel to the disc 10 are held by a holder 70 and flat washer-like spacers 72 may or may not be utilized. All that is required to change the angle of the bit 40 from extending away from the disc 10 to an angle extending toward the disc 10 is to rotate the holder 18 180° and reinsert the bit in the opposite end of the slot 34. Accordingly, a minimum number of component parts need to be kept in stock for repair purposes and when repair is needed a given bit may be easily replaced by loosening the two bolts 46 and allowing the bit to readily drop out of the slot 34.

I claim:

1. A cutter disc, comprising,
a rotatable, cutter disc having a center axis of rotation,
a plurality of cutter tools mounted on said disc radially outwardly of said center axis of rotation,
said cutter tools each including a holder and a bit, said bit having a cutting head and shank, said holder having a pair of half sections having mating faces in a plane extending at angle to said disc, one of said half sections having a slot formed in its mating face with said bit shank positioned in said slot, and locking means interconnecting said half sections to hold said bit and secure said cutter tool to said disc with said bit extending at angle to said disc.

2. The structure of claim 1 wherein said cutter tools are mounted on opposite sides of said disc and said bits extend radially relative to said disc center axis of rotation.

3. The structure of claim 1 wherein cutter tools include said holders positioned on said disc to provide at least one bit extending angularly outwardly of said disc and one bit extending angularly inwardly of said disc.

4. The structure of claim 1 wherein said cutting head on said bit includes a depth limiting shoulder in engagement with the outer edge of said holder whereby said bits are positioned in said holders at a uniform depth.

5. The structure of claim 1 wherein said slot in said one half section face has a depth perpendicular to said face which is less than the thickness of said bit shank and said holder half sections are drawn into clamping engagement with said bit shank by said locking means.

6. The structure of claim 1 wherein said locking means includes a pair of bolts extending on opposite sides of said bit perpendicular to the plane of said disc.

7. The structure of claim 1 wherein two of said cutter tools are disposed directly opposite each other on opposite sides of said disc and said locking means includes a pair of bolts on opposite sides of said pair of bits locking said two pairs of half sections to said disc.

8. The structure of claim 1 wherein all of said cutter tool holders having bits extending at an angle to said disc are substantially identical and interchangeable.

9. The structure of claim 1 wherein said slot includes a bottom wall and oppositely disposed perpendicular parallel side walls and said bit shank is rectangular in cross section to matingly engage said walls of said slot.

10. The structure of claim 9 wherein the mating face of said other half section is substantially flat and matingly engages a side surface of said bit shank.

* * * * *